United States Patent [19]

Ho et al.

[11] Patent Number: 5,319,678
[45] Date of Patent: Jun. 7, 1994

[54] CLOCKING SYSTEM FOR ASYNCHRONOUS OPERATIONS

[75] Inventors: Steven Ho, Westford; Niamh Darcy, Boxboro, both of Mass.

[73] Assignee: Digital Equipment Corporation, Maynard, Mass.

[21] Appl. No.: 854,519

[22] Filed: Mar. 20, 1992

[51] Int. Cl.$^5$ .............................................. H04L 7/00
[52] U.S. Cl. ..................................... 375/106; 307/269
[58] Field of Search ............... 375/106, 107; 455/51.1, 455/53.1; 370/108; 307/269, 265; 328/55, 58, 63

[56] References Cited

U.S. PATENT DOCUMENTS

4,968,906 11/1990 Pham et al. ........................... 307/269
4,985,639 1/1991 Renfrow et al. ...................... 307/268
5,059,818 10/1991 Witt et al. ............................. 307/269
5,124,573 6/1992 Wong ................................... 307/265

*Primary Examiner*—Curtis Kuntz
*Assistant Examiner*—Hai H. Phan
*Attorney, Agent, or Firm*—Richard J. Paciulan; Denis G. Maloney

[57] ABSTRACT

A clock mechanism in modules connected to a bus over which asynchronous operations are performed wherein clock pulses are generated that can clock the transmission or capture of data and the transitioning of acknowledge or synchronization lines. Each clock mechanism generates its clock pulses based on the receipt of signals associated with synchronization or acknowledge bus lines. The clock mechanism includes a multiplexer which provides to a resettable latch a signal associated with the condition of the selected line. The resettable latch, in conjunction with a delay element produces the clock pulses.

25 Claims, 4 Drawing Sheets

CLOCKING SYSTEM FOR ASYNCHRONOUS OPERATIONS

FIELD OF INVENTION

The invention relates generally to a system for generating a clock signal to clock an asynchronous state machine.

BACKGROUND

An asynchronous state machine, by definition, changes from a current state to a next state based on its present state and the condition of signals from external devices indicating the states of these devices. For proper operation of the state machine, the signals must be conditioned, that is, transitioned, in a particular order and/or combination. If, for example, a given signal is asserted late or released early, it may cause the state machine to change to an unintended next state.

In a system of interest, asynchronous state machines are employed in transactions between modules on a bus referred to as the "Futurebus+." A transaction follows a "compelled" protocol in which one or more modules operating as slaves must provide to a module operating as a bus master various acknowledgement, or handshake, signals throughout the operation. When the master receives these signals it proceeds to the next stage of the operation. The compelled protocol is described in IEEE Standard 896, the Futurebus+ standard, which is incorporated herein by reference.

Every compelled transaction on the Futurebus+ includes a connection phase and a disconnection phase and may or may not include a data phase between the connection and disconnection phases. Each phase involves specific asynchronous, or compelled, communications between the designated bus master module and one or more slave module(s). The data phase is segmented into a number of "beats," where a beat includes the transition, that is, assertion or release, of a synchronization line by a master followed by the release of an appropriate acknowledge line by the slave(s). Between the transitions of the various synchronization and acknowledge lines, the bus master and slaves place data on, and capture data from, the bus.

During a first beat and subsequent "odd" beats of a compelled write operation, for example, a master sends command information and (write) data over the bus and asserts a data synchronization line DS. The participating slaves then capture the command information and (write) data, place status information on the bus and release an appropriate acknowledgement line. During a second or subsequent "even" data beat the master captures the slave status information, sends to the slaves the next (write) data and releases the data synchronization line DS. The slaves then capture the data, place status information on the bus and release an appropriate acknowledgement line. When the master senses the release of the acknowledgement line, it starts the next beat of the operation.

The master continues to assert and release the data synchronization line DS whenever it places (write) data on the bus and the slaves continue to release acknowledgement lines whenever they place status information on the bus. If a compelled read operation is being performed, the slaves send (read) data to the master with the status information before releasing their acknowledgement lines, the master captures the (read) data and sends command information and data synchronization assertions or releases to the slaves, which direct the slaves to send additional data.

If the bus master and slaves do not assert and release their synchronization and acknowledgement signals in the proper order and do not properly coordinate their data transmissions and data capture operations with the appropriate synchronization and acknowledgement signals, the data transfer operation may not complete and the bus may therefore "hang", which means that the various modules will each be waiting either for a next transition on an acknowledge line or a next transition on a synchronization line, and thus, none of the modules can transition to a next operation step.

SUMMARY

The inventive system includes in each module a clock mechanism which generates clock pulses that essentially clock the transmission or capture of data and the transitioning of acknowledge or synchronization lines. Each clock mechanism generates its pulses based on the receipt of selected acknowledge or synchronization signals. The state of an asynchronous state machine controls the selection of lines to which the clock mechanism responds during each of the phases of a transaction. The clock mechanism, in turn, clocks the state machine, which changes its state based on the conditions of various synchronization and acknowledge lines, the phase of the data transfer operation and the role of the particular module in the operation, i.e., whether the module is a bus master, a "selected" slave which participates in the data phase of a transaction or an "unselected" slave which does not participate in the data phase of a transaction.

The clock mechanism consists of (i) a multiplexer which selects various acknowledge or synchronization lines and passes a signal associated with the condition of a selected line, (ii) an S-R latch, or flip-flop, which receives the signal from the multiplexer on its set input line and asserts its Q output line in response to an asserted signal on its set input line to produce the rising edge of the pulse, and (iii) a delay element attached to the flip-flop between the output line and a reset input line, which resets the flip-flop after a predetermined time period to produce the falling edge of the pulse, and then holds the flip-flop in a reset state for a minimum predetermined time period. The delay element essentially establishes the pulse width of the clock pulses and the minimum cycle time for consecutive pulses.

When the S-R latch has asserted signals on both its set input line and its reset input line, the latch resets and drives the Q output line low. A predetermined time later, the delay element passes to the reset line the condition of the (low) output line, and the latch sets its Q output line high in response to the asserted set input line. A predetermined time later the reset line is again asserted, when the delay element passes to it the condition of the Q output line. The latch can thus toggle between set and reset conditions to produce a series of minimum-period clock pulses.

At the start of a transaction, the clock mechanism which is in the module that is to act as bus master responds to a combination of signals which indicates that the module can take control of the bus, that is, start its bus tenure. The clock mechanism produces one or more clock pulses, which enable the module to place address and control information on the bus and assert an address synchronization line AS. The asserted line indicates to the other modules on the bus that the module is operating as the bus master. The clock pulses also clock the state machine, which changes from a state associated with the start of bus tenure to a state associated with the connection phase of the transaction.

In response to the change of state of the state machine, the multiplexer passes to the flip-flop a signal associated with the condition of an address acknowledge line AI. The address acknowledgement line AI is asserted at this stage of the operation, and the multiplexer passes to the flip-flop a released signal. The line will be transitioned to release by all the slaves on the bus when they transmit status and capability information back to the master. However, since the selected acknowledgement line is asserted, the clock refrains from generating a next clock pulse after it resets. The master will thus not proceed to the next state of the transaction, which is the capture of slave status and capability information.

When the clock mechanism senses a released address acknowledge AI line it generates one or more clock pulses which enable the master to capture and decode the slave status and capability information. The clock pulses also clock the state machine which changes to a next state associated with either a data phase or a disconnect phase, depending on the condition of signals received from the slaves. If the next phase is the data phase and the operation is a write operation, the module places data on the bus and through its state machine asserts its data synchronization line DS. The state machine also directs the multiplexer to pass to the clock the condition of a data acknowledge line DI. The data acknowledge line DI is transitioned by the slaves to indicate their transmission of further status information in response to the receipt of data from the master.

In response to the release of the data acknowledge line DI, the master's clock mechanism produces a next clock pulse which enables the bus master to capture the transmitted status information, place data on the bus and transition the data synchronization line DS. The clock pulse also clocks the state machine, which updates its state to a next state associated with the data phase. The transaction continues on in this way until either the slave sends an end of data transfer status to the master, or the master completes its data transfer.

If the operation is at its end, the master's state machine transitions to a state in which it selects for passing to the clock an address acknowledge signal AK associated with the disconnection of the slaves. When this address acknowledge line AK is released, the master's clock generates one or more clock pulses which enable the master to relinquish control of the bus and release an end-of-tenure line ET, which it asserted when it gained control of the bus.

The bus master may not access the bus in between clock pulses. The bus master thus may not place data on the bus, attempt to capture status information from the bus, or alter bus control lines to end a transaction until the clock generates a pulse in response to the release of the appropriate, i.e., selected, acknowledge line. The clock will not respond to the conditions of any of the other acknowledge lines, since their conditions will not be passed through the multiplexer. The clock mechanisms in modules acting as slaves similarly control the (read) data or status information transmission operations and the (write) data capture operations of the slaves.

BRIEF DESCRIPTION OF THE DRAWINGS

The invention will be pointed out with particularity in the appended claims. The above and other advantages of the invention may be better understood by referring to the following description taken in conjunction with the accompanying drawings, in which:

DETAILED DESCRIPTION

Figure 1:
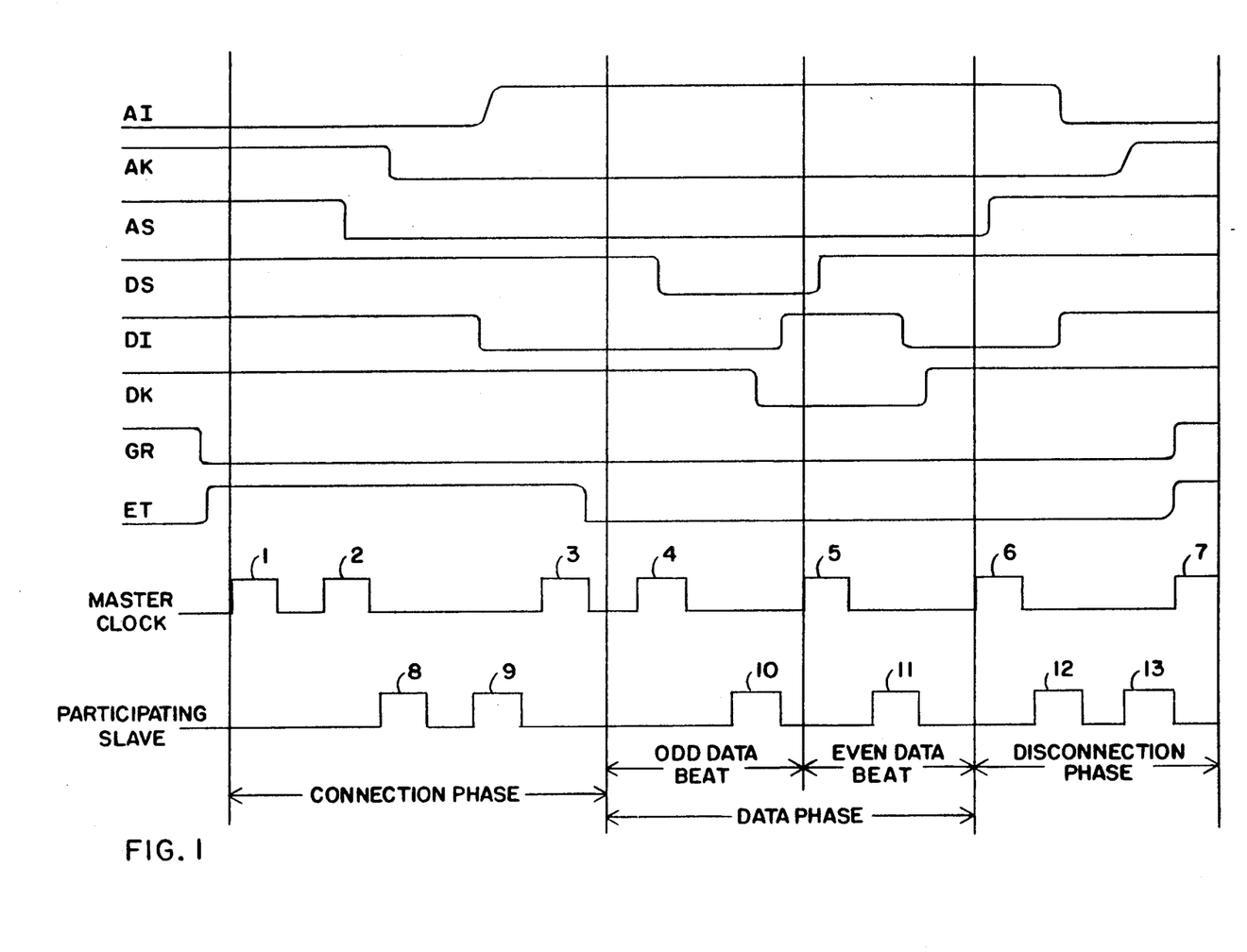
FIG. 1 is a timing diagram of a transaction between modules on the Futurebus+ and clock pulses generated by clock mechanisms in the modules.

FIG. 1 is a timing diagram illustrating signals asserted and released by a bus master and a participating slave module during a compelled transaction on the Futurebus+. The signals are asserted low and released high. The particular compelled transaction has a connection phase, a data phase with two data beats and a disconnection phase. Every compelled operation must include the connection and disconnection phases, and may or may not include the data phase. The diagram also includes clock pulses 1-12.

Figure 2:
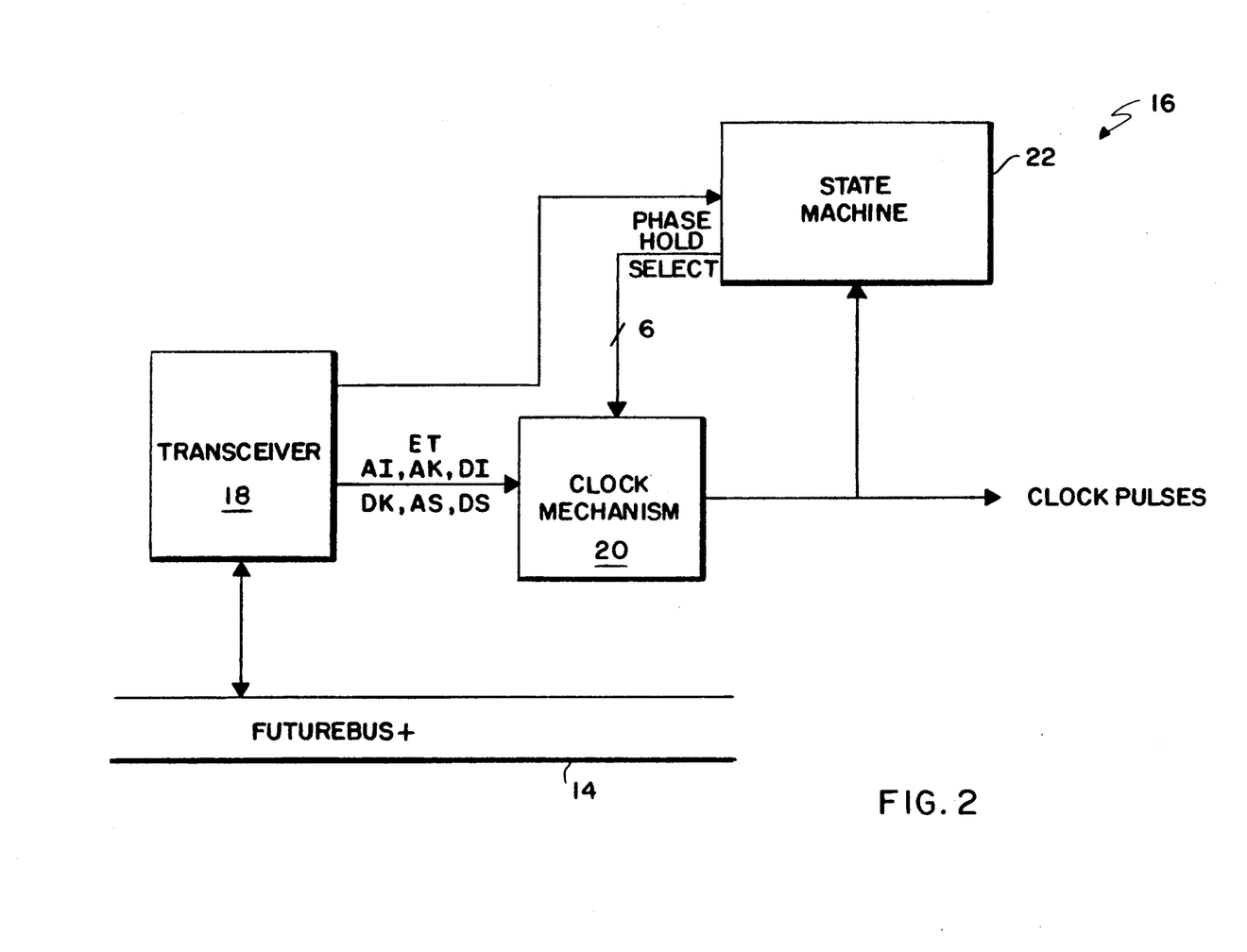
FIG. 2 is a block diagram of a portion of a module which connects to the bus.

FIG. 2 depicts in block diagram form a module 16. The module includes a module clock mechanism 20, which in a master operating as a bus master produces clock pulses 1-7 and in a module operating as a slave produces clock pulses 8-13 (FIG. 1). The clock mechanism 20 receives signals from both a transceiver 18 connected to the bus 14 and a state machine 22, as discussed in more detail below with reference to FIG. 3.

Referring to FIGS. 1 and 2, the operation of module 16 acting as bus master during a transaction is discussed. Before the module 16 can begin the transaction, it sends to a central arbiter (not shown) a request for control of the bus. The module 16, which becomes a "bus master-elect" once it receives a "grant" signal from the central arbiter, must then wait for the receipt of appropriate bus control signals before it can begin its bus tenure.

The module is in its start-bus-tenure state in which it responds to a combination of (i) an asserted grant line, which indicates that the module can begin its bus tenure once the previous transaction is fully disconnected, (ii) a released bus tenure line ET, which indicates that the previous bus master has relinquished control of the bus, and (iii) a released address acknowledge AK line, which indicates that the slaves have disconnected from the previous transaction. When the module senses that the bus control lines are in the appropriate conditions, it asserts the bus tenure line ET.

At the start of the transaction, with the state machine 22 in the start-bus-tenure state, the state machine 22 selects and passes to the clock mechanism 20 the condition of both the bus tenure line ET and the address acknowledge line AK, both of which are associated with the end of the previous transaction. When the selected lines are is in the appropriate condition, clock mechanism 20 generates clock pulses 1 and 2. The first clock pulse 1 enables the module essentially to change the operation of the transceiver 18 from a receiver to a transmitter.

The second clock pulse 2 enables the transmission and handshake circuitry in the transceiver 18 and the transceiver 18 places on the bus 14 address and command information. The module then asserts an address synchronization AS line. The second clock pulse also clocks the state machine 22, which changes from its start-bus-tenure state to a state associated with the connection phase. In this state the state machine selects to pass to the clock mechanism 20 the condition of an address inverse acknowledge AI line.

A clock mechanism 20 in a module acting as a slave in the transaction responds to the master's assertion of the AS line by generating clock pulses 8 and 9. These pulses enable the slave to capture from the bus 14 the address and command information transmitted by the master and assert an address acknowledge AK line. The slave also places status and capability information on the bus 14, asserts a data inverse acknowledge DI line and releases its AI line. If the slave is a selected slave, that is, a slave actively participating in the transaction, its state machine changes on the second clock pulse to a state associated with a data phase. In this state, it monitors the conditions of both the address acknowledge AS line and a data synchronization DS line.

If the master next transmits data, the master asserts its data synchronization DS and the slave state machine responds to the asserted line by capturing the transmitted data, placing status information on the bus and releasing its data inverse acknowledge DI line. However, the master next transmits end-of-operation information, it releases the address synchronization AS line and the slave responds to the released line by capturing the information and disconnecting from the transaction, as discussed below.

If the slave is unselected, that is, it is not actively participating in the transaction, its state machine monitors the address synchronization line only. When the slave senses the release of this line, it disconnects from the transaction as described in more detail below.

When the clock mechanism 20 in the master sense the release of the address inverse acknowledge AI line, it generates clock pulses 3 and 4. The clock pulses clock data capture circuitry and the master captures, through transceiver 18, the status information transmitted by the slave. If the master determines, based on the captured status and capability information, that it can proceed with the data phase of the data transfer operation, it places data on the bus and asserts the data synchronization DS line. The state machine 22 then changes state on the second clock pulse 4 to a state associated with an odd beat of a data phase, and selects the data inverse acknowledge DI line to pass to the clock mechanism 20. Otherwise, the master begins a disconnection phase and the state machine changes to a state associated with that phase.

If the transaction is in the data phase, the clock mechanism 20 in the slave module responds to the asserted data synchronization DS line by generating a clock pulse 10. The clock pulse clocks data capture circuitry in the slave and the slave captures the transmitted data. The slave then asserts a data acknowledge "DK" line, places status information on the bus and releases the data inverse acknowledge DI line to signal the transmission of the status information. The release of the DI line also signals the end of the first, or odd, data beat.

The clock mechanism 20 in the master module responds to the release of the data inverse acknowledge DI line by generating a clock pulse 5. The clock pulse 5 clocks data capture circuitry and the master captures the information transmitted by the slave. The master then places data on the bus and releases the data synchronization DS line. The state machine 22 also changes state to a state associated with an even data beat and selects the data acknowledge DK line to pass to the clock mechanism 20.

The slave responds to the release of the data synchronization DS line by generating a clock pulse 11, capturing the transmitted data, asserting the data inverse acknowledge DI line, placing status information on the bus and releasing the data acknowledge DK line to signal transmission of the status information and the end of the data beat.

The master responds to the release of the data acknowledge DK line by generating a clock pulse 6 and capturing the information transmitted by the slave. Either the information from the slave informs the master of the slave's end of transaction status or the master has transmitted all its data, since the master next transmits end-of-transaction information and releases its address synchronization AS line, which signals the beginning of a disconnection phase. The state machine 22 also changes state, to a state associated with the disconnection phase, and selects to pass to the clock mechanism 20 the condition of the address acknowledge AK line.

The slave responds to the release of the address synchronization AS line by generating a clock pulse 12. This clock pulse enables the slave's data capture circuitry and the slave captures the end-of-transaction information transmitted by the master. The slave then asserts its address inverse acknowledge AI line and releases its data inverse acknowledge DI line in accordance with the protocol. The slave next transmits status information and releases its address acknowledge AK line to signal its disconnection.

In response to the release of the address acknowledge AK line, the clock mechanism 20 in the master generates a clock pulse 7, and the master releases its bus tenure line ET to signal the end of its tenure as bus master.

If a transaction includes an odd number of data beats, the clock mechanism 20 generates an extra clock pulse during the disconnection phase to enable the master to release its data synchronization DS line. The state machine 22 includes special states for this situation. The state machine in the slave module must, for example, ignore the release of the data synchronization DS line in the disconnection phase. Also, the state machine in the master must select a line for the clock mechanism 20 which allows it to clock the master through the completion of its disconnection. Other circumstances which normally require extra clock pulses may be similarly handled, with the inclusion of various special states in the state machine.

Figure 3:
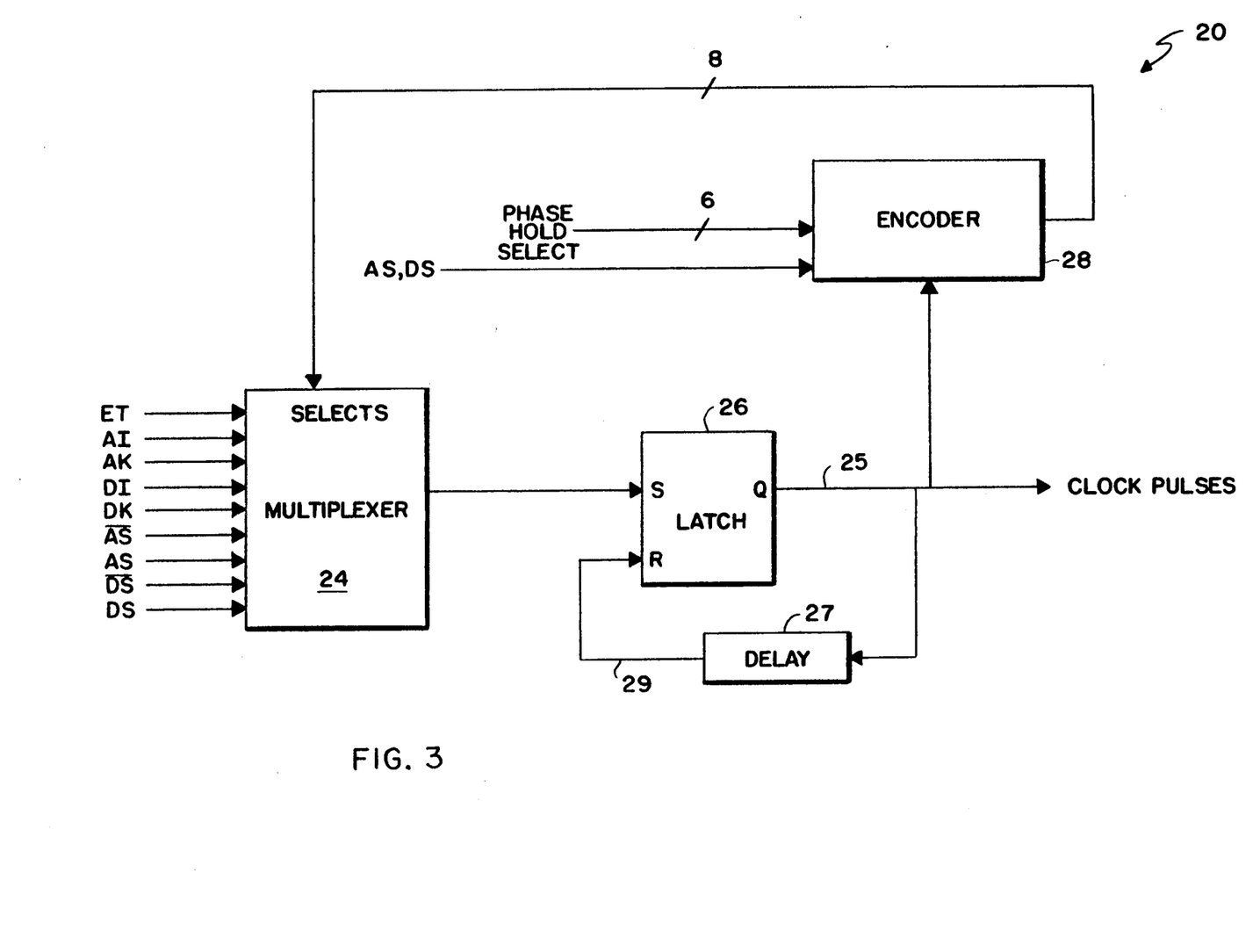
FIG. 3 is a block diagram of the clock mechanism of FIG. 2.

FIG. 3 depicts in block diagram form the clock mechanism 20 (FIG. 2). An encoder 28 receives phase/hold/select signals from the state machine 22 (FIG. 2) which relate to the current phase of the transaction and the role of the module 16 (FIG. 2) in the operation, i.e., its role as bus master, selected slave or unselected slave. The encoder 28 encodes these signals to produce multiplexer selection signals which select to pass through multiplexer 24 one, the logical OR of two, or the logical AND of two of nine multiplexer input lines. In response to the selection signals, the multiplexer 24 passes the condition of the selected line to a set-reset latch, or flip-flop, 26. If the selected line is asserted, and the reset input line of the flip-flop 26 is not asserted, the flip-flop 26 asserts its output line 25 and produces the rising edge of a clock pulse.

The asserted output line 25 enables a delay element 27 which a predetermined time, "$t_{DELAY}$," later asserts the flip-flop's reset line. After a delay of $t_{PROP\ DELAY}$, which is the propagation delay through the flip-flop 26, the output line 25 goes low, which produces the falling edge of the clock pulse. The delay element 27 holds the flip-flop 26 in the reset condition for time $t_{DELAY}$, and thereafter, it releases the reset line. If the multiplexer 24 is not then passing an asserted line to the flip-flop 26, the clock is idled. Otherwise, the clock generates another clock pulse.

The clock pulses have a minimum period of:

$$2(t_{DELAY}+t_{PROP\ DELAY}).$$

The period, and thus the length of the delay, is chosen such that the flip-flops responding to the handshake signals, for example, the flip-flops in the state machine 22 (FIG. 2), will have time to set-up before their output signals are again used to control the operation of the module.

Different delay times of the delay element 27 could be used to set the clock duty cycle and the cycle period, in which case the clock pulses would have a minimum period, or cycle length of:

$$t_{DELAY\ SET}+t_{DELAY\ RESET}+2(t_{PROP\ DELAY})$$

where $t_{DELAY\ SET}$ is the delay between the setting of the output line 25 high and the setting of the reset input line 29 high, and $t_{DELAY\ RESET}$ is the delay between resetting the output line 25 to low, and the release of the reset input line 29. The propagation delays associated with the set and reset input lines of the flip flop 26 may be different, also, in which case the cycle period has a length of:

$$t_{DELAY\ SET}+t_{DELAY\ RESET}+t_{PROP\ DELAY\ VIA\ SET}+t_{PROP\ DELAY\ RESET}$$

If, at any time, a master or a slave requires extra time to perform a function, such as changing the operation of the transceiver 18 from a transmitter to a receiver or synchronizing its data capture or data transmission operations to a event occurring elsewhere in the module 16, the master or slave may assert, at a next clock pulse, a hold signal which disables the multiplexer 24. The multiplexer 24 thus does not pass anything to the flip-flop 26, and the flip-flop 26 is idled. When the situation for which the hold was asserted changes and the interruption of the data transfer operation is no longer necessary, the module releases the hold signal, which enables the multiplexer 24. The multiplexer 24 then passes to the flip-flop 26 a signal associated with the condition of the selected line. If this signal is asserted, it sets the flip-flop 26, which produces a clock pulse. Otherwise, the flip-flop 26 remains in its idled condition.

The hold signal changes from released to asserted only during a clock pulse. In this way, it cannot disrupt the synchronous-like operations of the state machine or violate the set-up times of flip-flops in, for example, the state machine 22 (FIG. 2).

Figure 4:
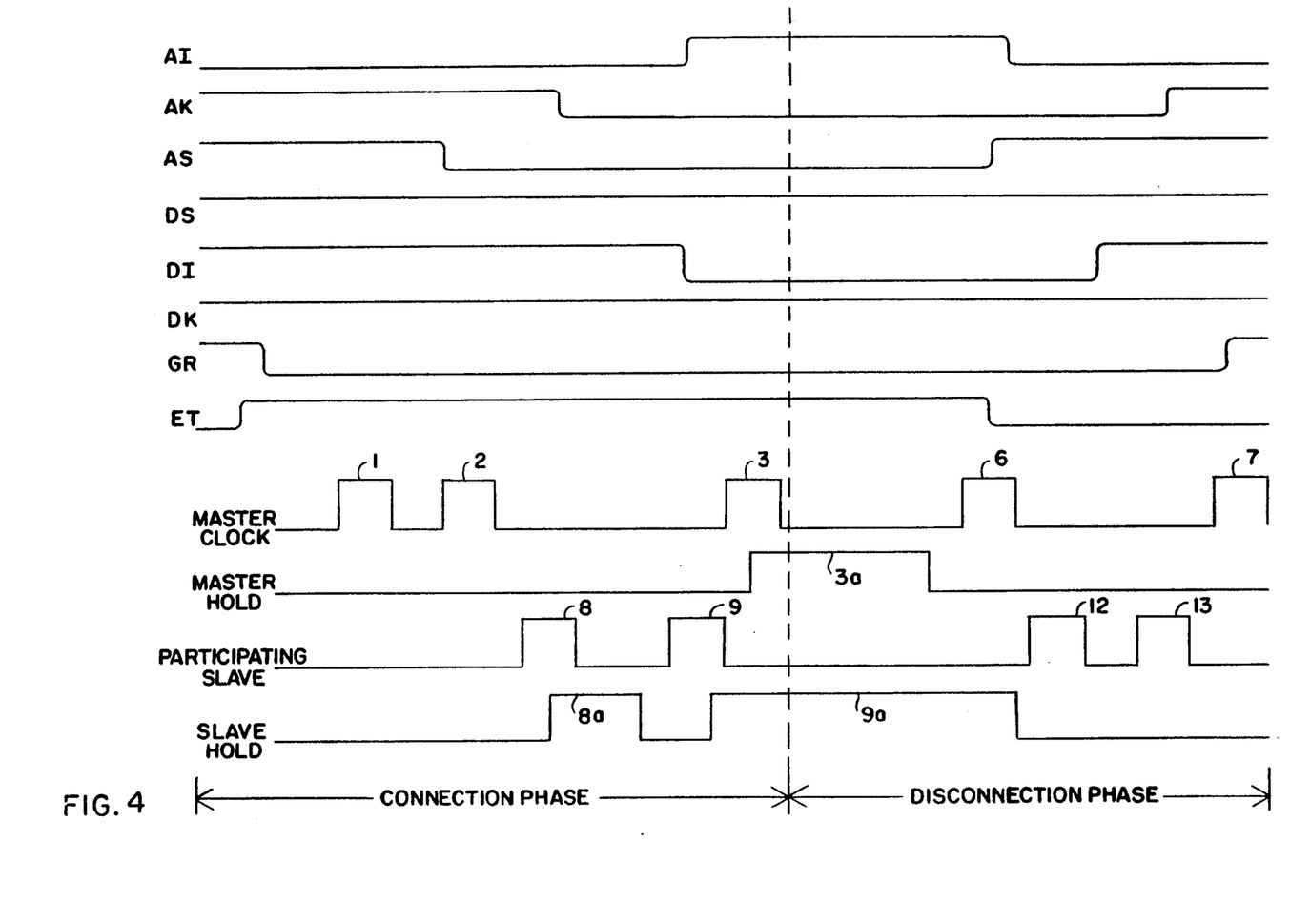
FIG. 4 is a timing diagram of a compelled address-only transaction between modules on the Futurebus+, the diagram includes hold signals asserted by the various modules and clock pulses generated by the module clocks.

FIG. 4 illustrates the affect of the hold signals on an address-only transaction, which is a transaction which includes connection and disconnection phases but no data phase. The times at which certain events in the connection and disconnection phases illustrated in FIG. 4 occur are later than the times at which the same events occur in the connection and disconnection phases depicted in FIG. 2. However, the order in which the events occur and the relationship between the events is the same. For example, the master asserts its hold signal 3a during the third clock pulse and pulse 6 is delayed. As soon as the master releases the hold signal, the clock mechanism 20 generates pulse 6 since the address inverse acknowledge AI line to which the clock responds is still high and the reset line of the flip-flop 26 is released. The pulse 6 enables the master to continue the transaction and ultimately release the address synchronization AS line to signal the start of a disconnection phase.

Similarly, the slave may assert its hold signal, for example, during pulse 9, and the slave's clock will refrain from generating pulse 12 until the slave hold is released. The slave will not produce a clock pulse even if the address synchronization AS line to which it's clock would otherwise respond is released by the master. The remainder of the data transfer operation is also on hold as long as the slave's hold signal is asserted, since the master can not complete the disconnection phase until it senses a released address acknowledge AK line and the slave will not release this line until its clock mechanism is enabled. As soon as the slave releases its hold and resumes its data transfer activities, the clock mechanism generates clock pulses 12 and 13 and provides to the master the signal which allows the master to continue its disconnection activities.

The clock mechanism 20, with its minimum width clock pulses, provides synchronous-like control to the modules involved in the compelled transactions. The clock thus eliminates timing hazards which are potentially present in an asynchronous transaction. Also, with the inclusion of a hold state, the clock accommodates a module's need to perform at various times functions which take longer than the minimum cycle of the clock, without sacrificing the synchronous implementation of the data transfer operation.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

We claim:

1. A clock mechanism, for a module connected to a bus over which asynchronous operations are performed, the clock mechanism including:

A. a resettable latch, the resettable latch having a first input line, a second input line and an output line which is in either of a set condition or a reset condition, the first input line controlling a conditioning of the output line to the set condition and the second input line controlling, when activated, a conditioning of the output line to the reset condition;

B. a delay element connected between the output line of the resettable latch and the second input line of the resettable latch, the delay element being activated when the output line of the resettable latch is in the set condition, the delay element delaying by a first predetermined time period, $t_{delay\ set}$, the activation of the second input line after the output line of the resettable latch is in the set condition and delaying by a second predetermined time period, $t_{delay\ reset}$, the de-activation of the second input line after the output line of the resettable latch is in the reset condition; with the resettable latch producing one or more clock pulses, each of the clock pulses with a pulse width of $t_{delay\ set}+t_{prop\ delay}$, where $t_{prop\ delay}$ is the propagation delay through the resettable latch, and a minimum cycle time of $t_{delay\ set}+t_{delay\ reset}+2(t_{prop\ delay})$; and C. selection means for selecting a bus line from a plurality of bus lines and passing to the first input line of the resettable latch a signal associated with the selected bus line, the selection means selecting the selected bus line in response to a receipt of one or more clock pulses from the resettable latch.

2. The clock mechanism of claim 1, wherein:
a. the selection means passes to the resettable latch an asserted signal if a selected line is in a predetermined condition associated with a current operation being performed by the module; and
b. the resettable latch produces the clock pulses in response to the receipt of an asserted signal from the selection means.

3. The clock mechanism of claim 1, wherein the selection means includes:
i. encoding means for receiving conditions of said plurality of bus lines wherein said plurality of bus lines include a plurality of synchronization and acknowledgement bus lines and based on these conditions providing selection signals; and
ii. a multiplexer connected to said plurality of synchronization and acknowledgement but lines and responsive to said selection signal, the multiplexer passing to the first input line of the resettable latch a signal associated with one of the plurality of synchronization and acknowledgement bus lines.

4. The clock mechanism of claim 3, wherein the encoding means is responsive to a state machine which responds to conditions of said plurality of synchronization and acknowledgement but lines and changes from a present state to a next state based on the conditions of one or more of the synchronization and acknowledgement bus lines and a role of the module in the operation being performed over the bus, with said encoding means encoding signals related to the state of the state machine to generate said selection signals for controlling the selection by the multiplexer of one of the synchronization and acknowledgement bus lines applied to the multiplexer.

5. The clock mechanism of claim 4, wherein the state machine receives the clock pulses produced by the resettable latch and changes state in response to one or more clock pulses.

6. The clock mechanism of claim 1, wherein:
a. the delay element delays the activation of the second input line and the de-activation of the second input line by the same period of time; and
b. the resettable latch produces a clock signal with a minimum cycle of $$2(t_{delay\ set}+t_{prop\ delay}).$$

7. The clock mechanism of claim 1, wherein the resettable latch responds to a transitioning of the reset condition to an asserted condition by resetting the output line, the resettable latch maintaining the output line in the reset condition until the reset line releases.

8. The clock mechanism of claim 1, wherein
a. the delay element delays the activation of the second input line by a time $t_{delay\ reset}$ and the de-activation of the second input line by a time $t_{delay\ set}$; and
b. the resettable latch produces a clock signal with a minimum cycle of $$2(t_{prop\ delay})+t_{delay\ set}+t_{delay\ reset}.$$

9. A module for performing asynchronous information transfer operations over a bus, the module including:
A. receiving means for receiving information over the bus;
B. transmitting means for transmitting information over the bus;
C. a clock mechanism for generating clock pulses to clock the receiving means and the transmitting means, the clock mechanism including:
i. a resettable latch, the resettable latch having a first input line, a second input line and an output line which is in either of a set condition or a reset condition, the first input line controlling a conditioning of the output line to the set condition and the second input line controlling, when activated, a conditioning of the output line to the reset condition;
ii. selection means for sensing the conditions of a plurality of synchronization and acknowledgement bus lines and, based on the conditions of one or more of the synchronization and acknowledgement bus lines, selecting one of the synchronization and acknowledgement bus lines and passing to the resettable latch a signal corresponding to the condition of the line selected;
iii. a delay element connected between the output line of the resettable latch and the second input line of the resettable latch, the delay element being activated when the output line of the resettable latch is in the set condition, the delay element delaying by a first predetermined time period, $t_{delay\ set}$, the activation of the second input line after the output line of the resettable latch is in the set condition and delaying by a second predetermined time period, $t_{delay\ reset}$, the de-activation of the second input line after the output line of the resettable latch in the reset condition;
iv. the resettable latch producing one or more clock pulses, each of the clock pulses with a pulse width of $t_{delay\ set}+t_{prop\ delay}$, where $t_{prop\ delay}$ is the propagation delay through the resettable latch, and a minimum cycle time of $t_{delay\ set}+t_{delay\ reset}+2\ (t_{prop\ delay})$;
v. the selection means passing the signal to the resettable latch in response to a receipt of one or more clock pulses from the resettable latch; and
D. conditioning means for conditioning the synchronization and acknowledgement bus lines, the conditioning means conditioning predetermined groups of the lines when information is received by the receiving means or information is transmitted by the transmitting means.

10. The module of claim 9, wherein:
a. the selection means passes to the resettable latch an asserted signal if the selected line is in a predetermined condition which is associated with the line selected and operations being performed by the module; and b. the resettable latch produces the clock pulse in response to the receipt of an asserted signal from the selection means.

11. The module of claim 9, wherein the selection means includes:
   i. encoding means for receiving conditions of said plurality of synchronization and acknowledgement bus lines and based on these conditions providing selection signals; and
   ii. a multiplexer connected to said plurality of synchronization and acknowledgement bus lines and responsive to said selection signals, the multiplexer passing to the first input line of the resettable latch a signal associated with one of the plurality of synchronization and acknowledgement bus lines.

12. The module of claim 11, wherein the encoding means is responsive to a state machine which responds to conditions of said plurality of synchronization and acknowledgement bus lines and changes from a present state to a next state based on the conditions of one or more of the synchronization and acknowledgement bus lines and a role of the module in the operation being performed over the bus, with said encoding means encoding signals related to the state of the state machine to generate said selection signals for controlling the selection by the multiplexer of one the synchronization and acknowledgement bus lines applied to the multiplexer.

13. The module of claim 12, wherein the state machine receives the clock pulses produced by the resettable latch and changes state in response to one or more clock pulses.

14. The module of claim 9, wherein:
   a. the delay element delays the activation of the second input line and the de-activation of the second input line by the same period of time; and
   b. the resettable latch produces a clock signal with a minimum cycle of $2(t_{delay\ set} + t_{prop\ delay})$.

15. A system of modules connected to a bus, the modules performing asynchronous information transfer operations to transfer information over the bus from one module operating as a bus master module to one or more modules operating as slave modules, each of the modules including:
   A. receiving means for receiving information over the bus;
   B. transmitting means for transmitting information over the bus;
   C. conditioning means for conditioning synchronization and acknowledgement bus lines, the conditioning means conditioning certain lines when information is received by the receiving means or information is transmitted by the transmitting means; and
   D. a clock mechanism for generating clock pulses to clock the receiving means and the transmitting means, the clock mechanism including:
      i. a resettable latch, the resettable latch having a first input line, a second input line and an output line which is in either of a set condition or a reset condition, the first input line controlling a conditioning of the output line to the set condition and the second input line controlling, when activated, a conditioning of the output line to the reset condition;
      ii. selection means for sensing the conditions of a plurality of synchronization and acknowledgement bus lines and, based on the conditions of one or more of the synchronization and acknowledgement bus lines, selecting one of said synchronization and acknowledgement bus lines and passing to the resettable latch a signal corresponding to the condition of the line selected;
      iii. a delay element connected between the output line of the resettable latch and the second input line of the resettable latch, the delay element being activated when the output line of the resettable latch is in the set condition, the delay element delaying by a predetermined time period, $t_{delay\ set}$, the activation of the second input line after the output line of the resettable latch is in the set condition and delaying by a predetermined time period, $t_{delay\ reset}$ the de-activation of the second input line after the output line of the resettable latch is in the reset condition;
      iv. the resettable latch producing one or more clock pulses, each of the clock pulses with a pulse width of $t_{delay\ set} + t_{prop\ delay}$, where $t_{prop\ delay}$ is the propagation delay through the resettable latch, and a minimum cycle time of $t_{delay\ set} + t_{delay\ reset} + 2(t_{prop\ delay})$
      v. the selection means passing the signal to the resettable latch in response to the receipt of one or more clock pulses from the resettable latch.

16. The system of claim 15, wherein:
   a. the selection means passes to the resettable latch an asserted signal if the selected line is in a predetermined condition which is associated with the line selected and the current stage of a transfer operation; and
   b. the resettable latch produces the clock pulses in response to the receipt of an asserted signal from the selection means.

17. The system of claim 15, wherein the selection means includes:
   i. encoding means for receiving conditions of said plurality of synchronization and acknowledgement bus lines and based on these conditions providing selection signals; and
   ii. a multiplexer connected to said plurality of synchronization and acknowledgement bus lines and responsive to said selection signals, the multiplexer passing to the first input line of the resettable latch a signal associated with one of the plurality of synchronization and acknowledgement bus lines, 18. The system of claim 17, wherein the encoding means is responsive to a state machine which responds to conditions of said plurality of synchronization and acknowledgement bus lines and changes from a present state to a next state based on the conditions of one or more of the synchronization and acknowledgement bus lines and a role of the module as bus master or slave in the operation being performed over the bus, with said encoding means encoding signals related to the state of the state machine to generate said selection signals for controlling the selection by the multiplexer of one the synchronization and acknowledgement bus lines applied to the multiplexer.

19. The system of claim 17, wherein the state machine receives the clock pulses produced by the resettable latch and changes state in response to one or more clock pulses.

20. The system of claim 15, wherein:

a. the delay element delays the activation of the second input line and the de-activation of the second input line by the same period of time; and b. the resettable latch produces a clock signal with a minimum cycle of $$2(t_{delay\ set} + t_{prop\ delay}).$$

21. The system of claim 15, wherein the module includes means for sensing the condition of a hold line and, based on this condition, asserting or releasing a hold signal which disables or enables the selection means.

22. A method for generating clock pulses for clocking a module engaged in performing an asynchronous data transfer operation over a bus to transfer data to one or more bus slave modules, the method including the steps of:

A. selecting a signal related to a state of one of the bus slave modules based upon a clock pulse;

B. using said signal to control a set condition of a resettable latch by setting the resettable latch to produce a rising edge of the clock pulse;

C. upon setting the resettable latch by the signal, delaying for a first predetermined time period the resetting of the resettable latch, resetting the resettable latch after the delaying of said first predetermined time period the resetting of the resettable latch producing a falling edge of the clock pulse;

D. maintaining the resettable latch in the reset condition for a second predetermined time period to delay a next clock pulse; and E. repeating steps A-D.

23. A method for generating clock pulses for clocking a module engaged in an asynchronous data transfer operation over a bus to receive data transferred by a bus master module, the method including the steps of:

A. selecting a synchronization signal related to a state of the asynchronous data transfer operation of the bus master module based upon a clock pulse;

B. using said synchronization signal to control a set condition of a resettable latch, by setting the resettable latch to produce a rising edge of the clock pulse;

C. upon setting the resettable latch by the synchronization signal, delaying for a first predetermined time period the setting of the resettable latch, resetting the resettable latch after the delaying of said first predetermined time period the resetting of the resettable latch producing a falling edge of the clock pulse;

D. maintaining the resettable latch in the reset condition for a second predetermined time period to delay a next clock pulse; and E. repeating steps A-D.

24. A method for generating clock pulses for clocking a module operating as a bus master or a bus slave on a bus over which asynchronous data transfer operations are performed, the method including the steps of:

A. selecting a signal related to a state of the asynchronous data transfer operations based upon a clock pulse and a. if the module including the clock mechanism is operating as a bus master, sensing an acknowledgement bus line from a module operating as a bus slave when the bus slave receives data transmitted by the bus master, and b. if the acknowledgement bus line is in a condition which indicates receipt of the data transmitted by the bus master, selecting said signal;

B. suing said signal to control a set condition of a resettable latch by setting the resettable latch to produce a rising edge of the clock pulse;

C. upon setting if the resettable latch by the signal, delaying for a first predetermined time period the setting of the resettable latch, resetting the resettable latch after the delaying of said first predetermined time period the resetting of the resettable latch producing a falling edge of the clock pulse;

D. maintaining the resettable latch in the reset condition for a second predetermined time period to delay a next clock pulse; and E. repeating steps A-D.

25. The method of claim 24, wherein the step of selecting a signal further includes:

a. if the module including the clock mechanism is operating as a bus slave, sensing a synchronization bus line from a module operating as a bus master when the bus master receives data transmitted by the bus slave; and b. if the synchronization bus line is in a condition which indicates receipt of the data transmitted by the bus slave, selecting the signal.

* * * * *